United States Patent Office 3,285,805
Patented Nov. 15, 1966

3,285,805
POLYVALENT METAL CARBONATE-EXTENDED PHENOLIC RESINS
Fred Bryner, Midland, Mich., assignor to The Dow Chemical Company, Midland, Mich., a corporation of Delaware
No Drawing. Filed Sept. 24, 1964, Ser. No. 399,059
24 Claims. (Cl. 161—262)

The present application is a continuation-in-part of applicant's prior copending application S.N. 213, 877, filed August 1, 1962, and now abandoned.

The present invention relates to novel adhesive compositions and articles manufactured therewith. More particularly, the invention concerns providing, in a single material, both an efficient catalyst and an extender for liquid phenolic resin adhesive formulations.

The use of partially condensed phenol-aldehyde resins in thermosetting, adhesive formulations is a highly developed art. Most of such formulations, when ready for use, comprise, in addition to the resin, a liquid dispersing medium, a catalyst to promote resin cure, an extender and sometimes special additives to modify such characteristics of the glue as its flowability, rate of cure, spreadability or viscosity.

Of primary concern herein are the catalytic and extending components of phenolic resin adhesive formulations. Catalysts are added to the formulation to promote resin cure under the influence of heat. The conventional catalysts are the alkali metal hydroxides and various water-soluble alkali metal salts of weak acids. While good results have been obtained with such catalysts, it would be desirable to extend the shelf life of the formulated resin.

Extenders are employed to reduce the relative proportion of resin solids required in a given adhesive formulation. Some of the extenders employed heretofore have been indicated to be useful in amounts up to as much as one part by weight per part by weight of resin solids. At such levels of extension, however, the adhesive formulations have generally been inadequate for the manufacture of exterior grade plywoods. For a definition of these standards, see the publication, "Douglas Fir Plywood Commercial Standard CS45–55."

A principal object of the invention is to provide an improved catalyst for liquid, phenolic resin adhesives, otherwise referred to herein as glues. A further object is to provide a highly extended, liquid adhesive composition based on thermosetting phenolic resins. A particular object is to provide a phenolic resin adhesive formulation, suitable for exterior grade plywood manufacture, characterized by both a greatly extended shelf life and a substantially greater extension of the resin than any heretofore attained in such adhesive formulations. Still another object is to provide a fire resisting phenolic resin adhesive having ultra high extension, e.g., up to as much as 700 percent based on the resin solids, for use in the manufacture of plywood and other wood products such as particle board. A special object is to provide a thermosetting phenolic resin adhesive which can be cured rapidly in the presence of free alkali metal hydroxide used to control the drying properties of the adhesive. A further special object is to provide an adhesive for plywood manufacture which is easily cut when thermoset. These and other objectives are accomplished in the present invention which is hereinafter set forth.

According to the present invention, a highly extended and efficaciously catalyzed phenolic resin adhesive formulation is obtained by uniformly mixing an aqueous phenolic resin with at least a catalytic proportion, e.g., from about 0.01 part to about 0.1 part, up to as much as about 6 parts by weight per part of the phenolic resin solids of a finely divided polyvalent metal carbonate, which is essentially insoluble in water. When used in amounts in excess of those required for catalysis, e.g. above about 0.1 part, and preferably above about 0.5 part, up to about 2 parts by weight per part of resin solids, the excess carbonate functions as an excellent extender for the resin in the preparation of highly extended exterior grade plywood glues. With ultra high extension of from about 2 parts up to about 6 parts of the extender per part of resin solids, excellent phenolic resin based adhesives are prepared for interior plywood and particle board gluing applications.

An additional additive to the formulation is a water-dispersible, carbonaceous extender-thickner. Effective amounts of the extender-thickner will vary, depending upon the type of carbonaceous material used, its compatibility with the phenolic resin, and the thickening required to give the formulation proper fluidity for spreading or spraying on wood to be glued. The amount used may vary from as little as about 0.01 part up to as much as about 2 parts thereof per part of resin solids. Best results are achieved when the amount of a given extender-thickener used is increased as the amount of the polyvalent metal carbonate is increased. For exterior grade plywood, the upper limit is about 1 part per part of resin solids. As employed above, the terminology "water dispersible" means that, as applied to a particular carbonaceous material, the material can be dissolved or suspended in water.

Also incorporated into the complete formulation is an effective amount of an aqueous dispersing medium. Enough of the aqueous dispersing medium is employed to provide a liquid formulation having a solids content from about 20 to about 60 percent by weight of the total composition. For plywood adhesives, the total solids content should lie within the range of 35 to about 60 weight percent of the complete formulation. Adhesives with ultra high extension will generally have solids contents within the range from about 20 to about 40 weight percent of the formulation.

The polyvalent metal carbonates employed herein are characterized as being essentially water-insoluble. This is to be construed as meaning water-solubility, at 25° C., of less than about 0.5 grams per 100 grams of water. The terminology, "finely divided," with reference to the polyvalent metal carbonates, means these materials have an average particle size small enough to pass through an 80 mesh screen, preferably a 160 mesh screen, of the Tyler mesh series.

As indicated above, the polyvalent metal carbonates may be employed primarily as catalysts. In such instances, smaller quantities thereof will be employed. However, in addition to being catalysts, which impart extended shelf lives to the formulated resins, the polyvalent metal carbonates are also highly effective extenders for the resin. Adhesive are provided, which, when thermoset, have excellent weathering properties in plywood glue lines. When it is desired to utilize the extending property of the carbonates, they can be employed conjunctively with the carbonaceous extender-thickener in exterior grade plywood adhesives in amounts sufficient to produce up to 250 percent total extension based on the weight of the resin solids. Even higher total extensions up to as much as 700 percent can be employed if lesser grades of phenolic resin adhesive, such as those employed in interior plywood, are desired. By total extension is meant the total combined percentage by weight, based on the weight of resin solids, of polyvalent metal carbonate and any carbonaceous extender-thickener that may be present in the final adhesive formulation.

Phenolic resins suitable for employment in the invention are thermosetting, base catalyzed, partial condensation products, soluble in aqueous solvents of one or more hydroxy aromatic compounds (phenols) and one or more suitable aldehydes. Aldehyde, as employed herein is inclusive of any aldehyde, or similarly acting material which forms an aldehyde in water. From about 1.8 to about 3, preferably from 2.0 to 2.3, chemical equivalents of the aldehyde are reacted with each mole of the phenol used. If desired, the partial condensation products can be modified as by reacting or mixing them with still other resin forming components or resinous reaction products to impart special properties to the phenolic resin. Particular condensation products are obtained by partially reacting, in appropriate proportions to provide a thermosetting product, a phenol, such as phenol, cresol, resorcinol, 3,5-xylenol, or mixtures of one or more of the foregoing, with a suitable aldehyde material. Specific examples of suitable aldehydes, or similarly acting materials, are aqueous formaldehyde, para-formaldehyde, trioxymethylene and the like methylene providing materials. Also operable are acetaldehyde, furfuraldehyde and the like aldehydic materials which react with the mentioned phenols to form soluble, intermediate, polycondensation products.

In a preferred embodiment of the invention, the phenolic resin used is a modified type which comprises an admixture of a water-soluble, thermosetting, partial condensation product of phenol and formaldehyde mixed with a water-soluble, fusible acetone-formaldehyde resin. A certain class of such resins is taught in U.S. Patent 2,629,703. The phenolic resin thus modified is well adapted for extension to ultra high levels with polyvalent metal carbonates. Thermosetting acetone-formaldehyde resins useful for this purpose can be prepared in the manner of the teachings of U.S. Patent 2,683,133.

It will be observed that the phenols specified are those having at least 3 reactive ring positions i.e., at least 3 nuclear carbon atoms having substituent hydrogen atoms in ring positions ortho and para to a hydoxy group. If desired, other phenols having less than 3 active positions can be used in admixture with one or more of the above-mentioned phenols, but it is essential in order to provide a thermosetting composition that at least a predominant portion of the phenolic reactant employed is of the class having 3 active ring positions.

The above thermosetting phenolic resins are normally prepared in the presence of an aqueous solvent with the aid of a basic catalyst. The usual procedure is to mix desired proportions of the resin forming reactants, and any desired modifying reactant, into a sufficient amount of an aqueous solvent to provide a liquid reaction system having from about 30 to about 60, preferably 38–50, percent by weight solids. A basic catalyst is added to the reaction mixture and the resulting system is heated at an elevated temperature to provide a partially condensed, fusible resin, which is at least water-dispersible in the presence of alkali, if not completely soluble therein. Exemplary aqueous solvents that can be employed as the reaction medium include, in addition to water, mixtures of water with the lower water-soluble alkanols, ketones and the like organic solvents miscible with water.

The water-dispersible carbonaceous extender-thickener mentioned above as a component of the phenolic resin formulation, may be inert to water or completely soluble in water, or merely swellable therein, but in any event it is a solid capable of forming a homogeneous, viscous disperson or solution in water. Suitable carbonaceous extender-thickeners include the naturally occurring and synthetic water-soluble gums such as gum arabic, karaya gum, locust bean gum, alginate, casein, soluble blood albumin and the water-soluble cellulose ethers. Other extender-thickeners include water-inert, but yet water-dispersible, finely divided, solid materials. Illustrative of this latter class are the thermal carbon blacks, finely divided coals such as the anthracities, bitumens and lignites and the like materials which, due to their small particle sizes, form viscous slurries in water.

Water-swellable organic materials constitute a preferred class of solid carbonaceous extender-thickeners. For instance, some organic materials can be treated with an alkali metal hydroxide to provide water-swellable organic extender-thickeners referred to herein as causticized organic materials. These include amylaceous materials, i.e., containing starches, such as flours obtained by processing wheat, corn, oats, rye and the like grains. Other materials of this nature are the pentosan residues obtained by chemical treatment of oat hulls, corn cobs and the like remnants of grain processing. Another source of the water-swellable organic extender-thickeners is amylaceous materials that have been heated in the presence of water.

When the causticized organic materials are used as the carbonaceous extended-thickeners, it is most convenient to prepare the causticized form of the aforementioned organic materials when formulating the adhesive composition. Enough of an alkali metal hydroxide, such as sodium hydroxide, is added to the resin formulation to causticize or swell the organic material. The amount of alkali metal hydroxide employed for this purpose will fall within the limits of from about 5 to about 45 percent by weight of the organic material.

In addition to the alkali hydroxide employed to causticize the organic materials, it may be desirable to add alkali hydroxide to improve the drying properties of the formulated adhesive. It is known that alkali hydroxide aids in water retention in the adhesive and thus permits longer assembly times. However, with the conventional plywood adhesives employing the prior art preferred alkali metal carbonate as a catalyst, such use is severely limited by the fact that excess alkali hydroxide retards the resin cure. This is illustrated by U.S. Patent 2,727,869 which shows that 45% of NaOH based on the organic extender is the maximum used to swell or causticize the extender, and U.S. Patent 2,878,197 which shows that the preferred ratio of alkali hydroxide to organic extender to be causticized varies between 0.1:1 and 0.2:1. It further teaches that too much NaOH tends to produce a slow rate of cure. (Column 10, lines 55–61).

When the insoluble polyvalent metal carbonates are used in accordance with the present invention, however, excess alkali hydroxide does not retard the adhesive cure rate. As a consequence, it is possible to maintain adequate cure rates in the manufacture of plywood and yet use excess alkali hydroxide to increase the assembly time. The amount of alkali hydroxide used in excess of that needed to causticize the organic material may be added at any stage of the formulation of the glue. Illustratively, it is possible to add some alkali hydroxide after the glue has been completely formulated. Thus, it is possible to modify the drying properties of a batch of glue after observation of its behavior on a glue spreader and in the initial assemblies of plywood.

Generally, in preparing a glue formulation of the invention from phenolic resin, polyvalent metal carbonate, aqueous dispersing medium and water-dispersible solid, carbonaceous extender-thickener, the components can be mixed together in any order. They are stirred or otherwise mixed, preferably at room temperature, until a uniform blend of a desired consistency is obtained. The blend consistency can be controlled by adjusting the amount of aqueous solvent medium used within the aforementioned limits.

However, if it is desired to use a causticized organic material as the water-dispersible carbonaceous extender-thickener and to prepare it in situ, it is preferred to add the resin components in a predetermined order. For convenience in describing this order of mixing, the components of an extended adhesive composition of the invention will have the designations set forth in the following schedule.

Designation:          Component
- A_____ Alkali metal hydroxide for causticizing the carbonaceous extender-thickener.
- E_____ Finely divided organic material reactive with alkadi metal hydroxides to provide a water dispersible extender-thickener.
- C_____ Finely divided, solid, polyvalent metal carbonate, catalyst and extender of the invention.
- M_____ Aqueous solvent medium.
- R_____ Soluble phenolic resin.

The general mixing order is set forth below for those materials, as delimited by the brackets for which the sequence of addition of the aforementioned ingredients must be controlled for best results. Within the brackets are materials for which the order of addition is immaterial. The mixing schedule proceeding from left to right is as follows:

$$[M, E, C]_1 \ [M, A]_2 \ [E]_3 \ [M, R, C]_4 \ [M, R]_5$$

For example, the materials within the brackets $[M, A]_2$ are added to a mixture of the materials within the brackets $[M, E, C]_1$; the material within the brackets $[E]_3$ is added to the resulting mixture of the materials within the brackets $[M, E, C]_1$ and $[M, A]_2$; etc.

In any one bracketed group of materials, the components therein can be added to the formulation simultaneously or in any order. Though mixing with the addition of each of the components is preferred, it is not necessary. In the foregoing schedule, when a component appears in more than one bracketed group of materials, the total amount thereof to be added can be apportioned, as desired, among the indicated points of addition so as to provide the resulting mixture with a convenient consistency for mixing. This is particularly true of the aqueous solvent medium (M). It is added to the formulation, as needed, to produce a consistency permitting easy mixing and effective application to a surface to be bonded.

The extended adhesive formulations prepared in accordance with the invention are particularly well adapted for the bonding of wood veneers to manufacture plywoods. Such adhesive formulations are spread on the wood plies in amounts ranging from about 18 to about 30 pounds of total solids per thousand square feet of double glue line. The assembly time can vary from about 5 to about 30 minutes or more and preferably from 10 to about 20 minutes. The press time for satisfactory results can be within the range from about 3 to about 10 minutes or more depending upon the temperature of the platens, the plies being bonded, the number of panels per opening and the like considerations, such as are apparent to those skilled in the art. After having been pressed and thoroughly cured at the bonding temperature of the glue formulation, the plywood is removed from the press and stacked for conditioning and completion of the adhesive cure.

Certain of the extended adhesive formulations of this invention, i.e., those of ultra high extension, are well adapted to serve as the adhesive for particle boards. In such operations, an adhesive formulation having from about 200 up to about 700% total extension based on resin solids is preferred. Also, to prepare adhesives with such ultra high exensions, it is often desirable to employ a modified phenolic resin containing from about 5% to about 50%, based on phenolic resin solids, of a water soluble, thermosetting acetone formaldehyde resin. In preparing the particle board, such a formulation is mixed with the wood particles in an amount to provide from about 2 up to about 6% resin solids, based on the weight of the wood particles. The formulation can be sprayed onto the particles as they are tumbled in suitable agitating means. The wood particle-glue mixture is then pressed at the curing temperature for the glue formulation. Satisfactory temperatures will usually be within the range from 250–350° F. During the heating cycle the press is gradually closed and held for a period of time at the desired pressure to complete the cure. A more complete decription of particle board technology is contained in U.S. Patents 2,446,304 and 2,583,618.

The following examples illustrate various aspects of the invention and should not be construed as limitations thereof.

Example 1

In this example, the essential glue components were water, calcium carbonate and a phenolic resin with a small amount of wheat flour as a carbonaceous extender-thickener. To 25 grams of a 60 percent dispersion of calcium carbonate in water was added 2 grams of water and 1 gram of wheat flour. The mixture was slurried and heated to about 100° C. for 5 minutes to swell the flour. After cooling the mixture at 25° C., two more grams of water were added to replace the water of evaporation. A commercial aqueous phenol-formaldehyde resin (42.5 percent by weight resinous solids) was then added to the mixture with mixing until 25 grams of the aqueous resin were incorporated into a smooth glue.

The formulation was characterized by 151 percent total extension with calcium carbonate and flour, based on the resin solids. It was used to prepare a 6 inch square plywood panel, 3 ply, of ⅛ inch thick Douglas fir heartwood veneer conditioned to a residual moisture content of 4.5 percent. The wet glue was spread with a brush at the rate of 49.2 pounds for 1,000 square feet of double glue line (MDGL). This is equivalent to 9.8 pounds of resin solids or 24.5 pounds of total solids per MDGL. After an assembly time of 5 minutes the panel was hot pressed for 3.5 minutes at a platen temperature of 275° F. and 200 p.s.i. Specimens cut from the resulting cured panel were boiled for 4 hours and subsequently sheared while wet at the glue line with a knife edge. The shearing resulted in 80 percent wood failure, determined by a standard technique.

Other glues are formulated in a similar manner by substituting small but effective thickening amounts of one or more water dispersible carbonaceous extender-thickeners of the class of water-soluble cellulose ethers, alginates, dextrans, corn starch, causticized pentosans, karaya gum, gum arabic, locust bean gum and casein for the flour employed above. The resulting mixtures have a consistency suitable for convenient and effective spreading on wood panels to be used in the manufacture of plywood. Plywoods so prepared are comparable in their water resistances to the above prepared plywood.

Example 2

In the present example, an adhesive composition of the invention is compared with phenolic resin based adhesive formulations of the prior art. Adhesive compositions in the prior art (Glues No. 1 and No. 2) were prepared according to the composition schedules as set forth in Table 1. Glue No. 1 was a standard commercial adhesive for the manufacture of exterior grade plywood having about the maximum recommended extension of phenolic resin for this purpose. Glue No. 2 had about 100 percent extension with a prior art extender.

TABLE 1

| Component | Glue No. 1 | | Glue No. 2 | |
|---|---|---|---|---|
| | Amount (grams) | Mixing Time (minutes) | Amount (grams) | Mixing Time (minutes) |
| Water | 222 | | 35 | |
| Furafil 100 extender [1] | 93.5 | 5 | [2] 12.5 | 2 |
| 50 percent aqueous caustic | 52.7 | 15 | 2 | 2 |
| Sodium carbonate | 21.6 | 5 | 2 | 15 |
| Water | 30 | 2 | | |
| Wheat flour | 24 | 5 | | |
| Phenolic resin [3] | 600 | 5 | 25 | 5 |

[1] A commercial extender obtained as the residue from the acid hydrolysis of pentosan containing materials.
[2] Mixture of 10 grams of Furafil 100 extender and 2.5 grams of wheat flour.
[3] Thermosettable, base catalyzed, intermediate condensation product of phenol and formaldehyde in water, the aqueous solution containing 42.5 percent solids in Glue No. 1 and 50 percent solids in Glue No. 2.

A similar procedure was employed to prepare an adhesive composition of the invention catalyzed and extended with calcium carbonate (Glue No. 3). The composition schedule and mixing times are set forth in Table 2.

TABLE 2

| Component | Glue No. 3 | |
|---|---|---|
| | Amount (grams) | Mixing Time (minutes) |
| Water | 172 | |
| Wheat flour | 16.4 | 5 |
| 50 percent aqueous caustic | 36 | 4 |
| Furafil 100 extender | 64 | 15 |
| 60 percent aqueous slurry of $CaCO_3$ | 302 | 5 |
| Commercial phenolic resin (aqueous solution with 42.5 percent resin solids) | 410 | 5 |

Douglas fir panels 12 x 12 inches, 3 ply, were constructed of 0.1 inch veneer of Douglas fir heartwood.

In this operation the glue formulations Nos. 1 and 3 were spread on the veneer with a commercial glue spreader at the spread rates shown in Table 3. These panels were left in closed assembly for ten minutes, after which time the 0.3 inch panel constructions were pressed, two per opening, at 175 p.s.i. and 285° F. platen temperature for 5 minutes.

Twelve 1 x 3 inch test specimens were cut from the resulting plywood panels. The test specimens were then subjected to boiling water for 4 hours and subsequently shear tested while wet.

In other similar tests, Glues Nos. 2 and 3 were employed to prepare 6 x 6 inch. 3 ply, panels of ⅜ inch veneer. The glues were spread on the wood with a brush at the rates shown in Table 3. Curing conditions were 5 minutes closed assembly time and pressing, one per opening, for 3.5 minutes at 200 p.s.i. and 275° F. platen temperature. Test specimens cut from the resulting panels were subjected to cyclic boiling for 4 hours and sheared at the glue line with a knife edge.

The percentage wood failure as the result of such shear testing was determined by visual observation. The specifications of the above described glue formulations used, along with the results of the testing operations, are shown in the following Table 3.

TABLE 3

| Glue | Glue spreader type | Percent total extension [1] | Glue spread rate; lbs./1,000 ft.² double glue line | | | Percent wood failure |
|---|---|---|---|---|---|---|
| | | | Wet spread | Resin solids | Total solids | |
| No. 1 | Mechanical | 47 | 52.0 | 12.4 | 20.7 | 83 |
| No. 3 | do | 150 | 47.3 | 8.23 | 21.5 | 85 |
| No. 2 | Brush | 100 | 52.3 | 8.35 | 19.1 | 7 |
| No. 3 | do | 150 | 44 | 7.65 | 20.0 | 85 |

[1] Total extension refers to the total weight percentage, based on the weight of the resin solids, of Furafil 100 extender, flour and, in the instance of Glue No. 3, calcium carbonate A comparison of Glues 1 and 3 shows that wood failure of the highly extended glues of the invention is as good as the prior art glues of low extension. The results with Glues 2 and 3 show that a common prior art extender does not provide a satisfactory glue line at the high level of extension successfully achieved under the invention.

*Example 3*

In this example, the extraordinary shelf life achieved by the use of calcium carbonate as a catalyst is illustrated. Two phenolic resin glues were prepared according to the following composition and mixing schedules. Note that the only significant difference in Glue No. 5 is the substitution of calcium carbonate for sodium carbonate in Glue No. 4. The latter glue represents a conventional plywood adhesive formulation of the prior art.

TABLE 4

| Component | Glue No. 4 Amount (grams) | Glue No. 5 Amount (grams) | Mixing Time (minutes) (both glues) |
|---|---|---|---|
| Water | 37 | 37 | |
| Furafil 100 extender | 15.6 | 15.6 | 2 |
| 50 percent aqueous caustic | 8.8 | 8.8 | 15 |
| Catalyst | [1] 3.6 | [2] 6 | 5 |
| Water | 5 | 7 | |
| Wheat flour | 4 | 4 | 5 |
| Commercial phenolic resin (aqueous solution having about 42.5 percent solids) | 100 | 100 | 5 |

[1] $Na_2CO_3$.
[2] $CaCO_3$

The resulting glues were stored under an atmosphere of nitrogen in metal cans at 25° C. After 42 days Glue No. 4 was no longer useable. It had formed a film or "skin" which rendered the mixture unsuitable for use as a plywood adhesive. After 99 days no change could be observed in Glue No. 5. A portion of this glue was used to prepare a plywood panel. The glue was spread easily with a brush and had the appearance of freshly made glue. The plywood panel made with this glue, spread at the rate of 51 pounds per MDGL, evidenced 90 percent wood failure for dry specimens and 87 percent wood failure subsequent to boiling in water for four hours.

Highly beneficial results are also achieved by the substitution of numerous other finely divided polyvalent metal carbonates, which are essentially insoluble in water, for the calcium carbonate employed in the foregoing examples. Specific metal carbonates that have been tested with resin formulations, similar to that of Glue No. 5 in the foregoing example, include finely divided forms of manganese carbonate, cadmium carbonate, magnesium carbonate, barium carbonate, nickel carbonate, zinc carbonate, lead carbonate and cupric carbonate. Minerals which are largely composed of insoluble, polyvalent metal carbonates such as limestone, dolomite, magnesite, calcite, aragonite and the like are also useful when ground to a suitable particle size.

Plywood panels prepared with such glues, catalyzed and extended with the above mentioned carbonates, evidence wood failures upon shearing of at least 70 percent and often as much as 95 percent or higher after being subjected to the full cyclic boil test.

*Example 4*

This example is to illustrate the applicability of the invention at ultra high levels of extension. In this instance limestone flour was employed as the source of the polyvalent metal carbonate. It was characterized by a particle size such that only 1.3% of the flour was retained on a screen of mesh size 200. The relative amounts of adhesive ingredients and mixing time per incremental addition are set forth in the following table.

TABLE 5

| Component | Amount (grams) | Mixing Time (minutes) |
| --- | --- | --- |
| Water | 52.0 | |
| Wheat flour | 4.0 | 5 |
| 50 Percent aqueous caustic | 6 | 5 |
| Limestone flour | 35.0 | 5 |
| Commercial phenolic resin (aqueous solution with 42.5 percent resin solids) | 27.9 | 5 |
| 50 percent aqueous caustic | 4.0 | 2 |

The above glue contained 43.3% glue solids of which 9.3 percentage points were resin solids. The total extension of the resin solids was 325%, wheat flour contributing 33.3% extension and limestone flour 291.7% extension.

To increase the assembly time of the glue formulation, the total amount of caustic used was 1.25 parts thereof per part of wheat flour. Since only about one half this amount of caustic was required to causticize the wheat flour, the excess caustic was available in the glue line to improve drying properties.

The adhesive formulation was then used to make test panels as in Example 1 employing a glue spread of 61.6 lb./MDGL. Panels were prepared having 5 to 20 minutes assembly times respectively. Specimens from the panels all passed at least 6 cycles of the cyclic cold soak test. During each cycle the specimen was soaked in water at room temperature for 4 hours and then dried at 50° C. for 19 hours. Failure was concluded when the glue line delaminated to a ¼ inch depth continuously for 2 inches along any glue line. Testing was terminated after 6 cycles.

*Example 5*

This example illustrates the exceptional performance obtained with acetone-formaldehyde modified phenolic resins at ultra high extensions. A modified phenolic resin based adhesive was prepared according to the following composition and mixing schedule.

TABLE 6

| Components | Amount (grams) | Mixing Time (minutes) |
| --- | --- | --- |
| Water | 40.0 | |
| Acetone-formaldehyde resin (57% solids in water)[1] | 1.5 | 1 |
| Wheat flour | 5.0 | 5 |
| 50 percent aqueous caustic | 1.3 | 2 |
| Water | 30.0 | 3 |
| Limestone flour | 15.0 | 2 |
| Commercial phenolic resin (aqueous solution with 42.5 percent resin solids) | 5.0 | 5 |

[1] This was a water soluble, base catalyzed partial condensation product of formaldehyde and acetone in a molar ratio of 4:1.

The above adhesive formulation contained 24.2% by weight glue solids of which only 3.07 percentage points were resin solids. The total extension of the resin solids was 665% of which 166% was attributable to wheat flour and 499% attributable to the limestone flour. The above glue was uniformly mixed with 100 grams of wood sawdust and the resulting blend was placed in a mold 6 x 6 inches square by 1½ inches deep. The mold was covered with a caul and the assembly placed in a press at 125° C. The press was closed over a period of 5 minutes to 115 p.s.i. and held at this pressure for 7 minutes. The particle board thus prepared was conditioned overnight in an oven at 95° C. and then cut into strips ⅛ inch wide through the thickness of the board. The board had a density of 46.3 lb. per cu. ft. and was easily worked by sawing or sanding. Evaluation of the test strips indicated the board had good dry strength and was moderately self extinguishing. Upon immersion in water, the board swelled 14% in the direction of compression within a few minutes. The one test sample was maintained in water for 5 months without any showing of further change.

A commercial particle board, containing 4.5% by weight phenolic resin as a binder, was subjected to like tests in water. This board swelled 25% in the direction of compression within 15 minutes after immersion and to a total of 38% within 3 days after immersion. After two months in water the board had disintegrated to form holes large enough to see through. After about 4 months the board had substantially fallen apart.

*Example 6*

This example illustrates the workability of plywood prepared with adhesives extended under the invention in comparison with plywood manufactured using prior art glues. Three adhesive formulations were prepared and utilized to glue 3 panels of plywood. The prior art formulation was the same as Glue No. 1 in Example 2. The adhesives prepared in accordance with the invention were similar to the prior art formulation, except that they contained sufficient calcium carbonate to provide 60% and 150% extensions of the resin solids respectively.

Panels prepared with each of the above adhesive formulations were subjected to sawing with a saber saw mounted in a fixed position. The panels were fed to the saw under a constant force of 1.8 pounds.

The measured value was the time in minutes required to make a cut of a total of 50 linear feet. The cutting times are reported for each of the glue formulations according to a panel series number which represents one group of 3 panels made from matched plies using the 3 glues respectively.

TABLE 7

| Panel Series No. | Cutting Times (Minutes) | | |
|---|---|---|---|
| | Glue 60% CaCO₃ | Glue 150% CaCO₃ | Prior Art Glue |
| 1 | 15 | 15 | 20 |
| 2 | 15 | 15 | 20 |
| 3 | 20 | 20 | 35 |
| 4 | 25 | 25 | ¹60 |
| 5 | 25 | 20 | 30 |
| 6 | 25 | 20 | 35 |
| 7 | 15 | 15 | 20 |
| 8 | 20 | 15 | 25 |
| 9 | 25 | 25 | 50 |
| 10 | 25 | 25 | 85 |

¹ A new saw blade was inserted.

From the foregoing it is apparent that the cutting times which reflect the ease of cutting, are substantially improved in plywood glued with formulations of the present invention. The plywood panels prepared with the glues of the invention having 60% and 150% extension were cut a total of 500 linear feet, with relatively little dulling of the saw blade. The plywood prepared with the commercial glue substantially dulled two saw blades.

*Example 7*

This example illustrates a subgeneric embodiment of the invention involving a particular combination of a polyvalent metal carbonate and a causticized organic thickener-extender. Under this embodiment the total extension of the phenolic resin in the glue is at least about 100% and up to as much as 250%. This total extension consists of at least about 50% extension by calcium carbonate, which as used herein is inclusive of minerals containing a substantial proportion of calcium carbonate such as limestone and dolomite flours, and at least about 40% extension, but not more than about 100% extension with a causticized organic material. Phenolic adhesives made with this combination of extenders constitute a highly superior adhesive for exterior grade plywood.

A formulation according to this aspect of the invention was prepared by mixing in a vessel 315 parts by weight of water, 100 parts by weight of finely ground residue from the acid hydrolysis of pentosan containing materials obtainable as a commercial extender and 22 parts by weight of wheat flour. The foregoing ingredients were mixed for 5 minutes after which 135 parts by weight of 50% aqueous caustic was added with a total mix time of 8 minutes. 171 parts by weight of limestone flour having a mesh size small enough to pass a 200 mesh screen was added with mixing for 10 minutes and thereafter 500 parts by weight of an aqueous phenolic resin containing 42.5% by weight resin solids was added with mixing for 5 minutes. The resulting formulation contained 17.3% resin solids and total glue solids of 46.3%. The total extension of the phenolic resin was 135% of which limestone flour contributed 79.3 percentage points and the commercial extender and wheat flour contributed the remainder.

The above prepared glue formulation was employed to prepare 12" x 12" panels of 5 plys of ⅛ inch Douglas fir veneer. The veneer had been redried to 1% moisture content. The glue spread rates were about 55 pounds/MDGL as applied with a mechanical glue spreader. Assembly times employed were 10 and 30 minutes followed by a press schedule involving 5.25 minutes at 300° F. under 185 p.s.i. Two panels at each assembly time were then cut into standard test strips and evaluated to determine their strength properties. Some were subjected to a full cyclic boil test in which the specimens were boiled in water for 4 hours, dried at 60° C. for 20 hours and boiled again for 4 hours. After being boiled the second time, the specimens were tested for their shear strength while wet. In a second test, the specimens were placed in water at 25° C. under a vacuum of at least 25 inches of water for 30 minutes. While still in the water, the specimens were subjected to a pressure of 60 p.s.i.g. for 30 minutes. When recovered from the water they were broken in a wet condition in a shear testing machine.

The results of these test operations in terms of the breaking shear strength and percentage wood failure are reported in the following Table 8. Each reported value is the average of 5 measurements.

TABLE 8

| Run | Assembly Time (Minutes) | Cyclic Boil Test | | Vacuum-Pressure | |
|---|---|---|---|---|---|
| | | Shear Strength (p.s.i.) | Wood Failure | Shear Strength (p.s.i.) | Wood Failure |
| 1 | 10 | 278 | 100 | 318 | 90 |
| 2 | 10 | 300 | 94 | 320 | 98 |
| 3 | 30 | 218 | 100 | 254 | 98 |
| 4 | 30 | 224 | 100 | 278 | 100 |

In addition to demonstrating superior adhesive properties, the data shows good insensitivity to the assembly time parameter.

What is claimed is:

1. A liquid adhesive composition comprising:
    (a) one part by weight of a water-soluble, thermosetting phenol-aldehyde resin,
    (b) from about 0.01 to about 2 parts by weight of a water-dispersible carbonaceous extender-thickener,
    (c) at least about 0.5 part up to about 6 parts by weight of a finely divided, solid polyvalent metal carbonate and
    (d) sufficient aqueous dispersing medium such that the total solids of the liquid adhesive composition is within the range from about 20 to about 60 percent by weight of the total composition.

2. A liquid adhesive composition as in claim 1 wherein the resin is a water-soluble, thermosetting, partial condensation product of formaldehyde and a phenol obtained by reacting, in the presence of an aqueous medium containing a basic catalyst, from about 1.8 to about 3 moles of formaldehyde per mole of the phenol.

3. A liquid adhesive composition as in claim 1 wherein the carbonate is calcium carbonate.

4. A liquid adhesive composition as in claim 1 wherein the carbonate is magnesium carbonate.

5. A liquid adhesive composition as in claim 1 wherein the carbonate is provided as limestone flour.

6. A liquid adhesive composition as in claim 1 wherein the carbonate is provided as dolomite flour.

7. A liquid adhesive composition as in claim 1 wherein the extender-thickener is a water-swellable, causticized organic material.

8. A liquid adhesive composition comprising
    (a) one part by weight of a water-soluble, thermosetting phenolic resin obtained by partially condensing from about 1.8 to about 3 moles of formaldehyde per mole of phenol,
    (b) from about 0.01 to about 2 parts by weight of a water-swellable, causticized organic material,
    (c) at least about 0.5 part up to about 6 parts by weight of a finely divided calcium carbonate and
    (d) sufficient aqueous dispersing medium such that the total solids of the liquid adhesive composition is within the range from about 20 to about 60 percent by weight of the total composition.

9. A liquid adhesive composition comprising
    (a) one part by weight of a water-soluble, thermosetting phenolic resin obtained by partially condensing from about 1.8 to about 3 moles of formaldehyde per mole of phenol, (b) from about 0.01 to about 2 parts by weight of a water-swellable, causticized organic material, (c) at least about 0.5 part up to about 6 parts by weight of a finely divided calcium carbonate, (d) sufficient aqueous dispersing medium such that the total solids of the liquid adhesive composition is within the range from about 20 to about 60 percent by weight of the total composition, and (e) an amount of alkali hydroxide, in addition to that reacted in the causticized organic material, sufficient to increase the assembly time of the liquid adhesive composition.

10. A liquid adhesive composition comprising
(a) one part by weight of a water-soluble, thermosetting phenolic resin which is a mixture of a water-soluble thermosetting condensate obtained by partially condensing from about 1.8 to about 3 moles of formaldehyde per mole of phenol and from about 5% up to about 50%, based on the weight of the condensate, of a water-soluble, thermosetting, partial condensation product of acetone and formaldehyde,
(b) from about 0.01 to about 2 parts by weight of a water-swellable, causticized organic material,
(c) from about 2 to about 6 parts by weight of a finely divided polyvalent metal carbonate, and
(d) sufficient aqueous dispersing medium such that the total solids of the liquid adhesive composition is within the range from about 20 to about 40 percent by weight of the total composition.

11. An article of manufacture comprising a composite of wood particles bonded together, under pressure, with the thermoset reaction product of the liquid adhesive composition of claim 10.

12. An article of manufacture comprising at least two plies of wood bonded together with the thermoset reaction product of the liquid adhesive composition of claim 10.

13. A highly extended liquid adhesive composition for exterior grade plywood comprising
(a) one part by weight of a water-soluble, thermosetting phenolic resin obtained by partially condensing from about 1.8 to about 3 moles of formaldehyde per mole of phenol,
(b) from about .01 to about 1 part by weight of a water-swellable, causticized organic material,
(c) at least about 0.5 up to about 2 parts by weight of a finely divided polyvalent metal carbonate, and
(d) sufficient aqueous dispersing medium such that the total solids of the liquid adhesive composition is within the range from about 35 to about 60 percent by weight of the total composition.

14. A highly extended liquid adhesive composition for exterior grade plywood, as in claim 13, wherein the polyvalent metal carbonate is calcium carbonate.

15. An exterior grade plywood comprising at least two plies of wood suitable for exterior plywood bonded together with the thermoset, reaction product of the liquid adhesive composition of claim 14.

16. A method for the production of a liquid, phenolic resin adhesive composition which comprises mixing together in any order:
(1) one part by weight of a water-soluble, thermosetting phenol-aldehyde,
(2) from about 0.01 to about 2 parts by weight of a water-dispersible carbonaceous extender-thickener,
(3) at least about 0.5 part up to about 6 parts by weight of a finely divided, solid polyvalent metal carbonate, and
(4) sufficient aqueous dispersing medium such that the total solids of the liquid adhesive composition is within the range from about 20 to about 60 percent by weight of the total composition.

17. A method as in claim 16 wherein the resin is a water-soluble, thermosetting, partial condensation product of formaldehyde and a phenol obtained by reacting, in the presence of an aqueous medium, containing a basic catalyst, from about 1.8 to about 3 moles of formaldehyde per mole of the phenol.

18. A method as in claim 16 wherein the finely divided carbonate is calcium carbonate.

19. A method as in claim 16 wherein the carbonate is magnesium carbonate.

20. A method as in claim 16 wherein the carbonate is provided as limestone flour.

21. A method as in claim 16 wherein the carbonate is provided as dolomite flour.

22. A method for the production of a liquid, phenolic resin adhesive composition which comprises mixing together:
(1) one part by weight of a water-soluble, thermosetting phenol-aldehyde resin, hereinafter designated R,
(2) from about 0.01 to about 2 parts by weight of an organic material reactive with an alkali metal hydroxide, hereinafter designated E,
(3) sufficient alkali metal hydroxide for causticizing the organic material, hereinafter designated A,
(4) at least about 0.5 part to about 6 parts by weight of a finely divided, solid polyvalent metal carbonate, hereinafter designated C, and
(5) sufficient aqueous dispersing medium such that the total solids of the liquid adhesive composition is within the range from about 20 to about 60 percent by weight of the total composition, hereinafter designed M, said mixing being conducted according to the mixing schedule proceeding from left to right as follows:

$$[M, E, C]_1 \ [M, A]_2 \ [E]_3 \ [M, R, C]_4 \ [M, R]_5$$

wherein groups of materials within the brackets can be mixed together in any order and the order of addition for each bracketed group of materials being indicated by the subscripts, the total amount of any component added being within the above prescribed proportions.

23. A highly extended liquid adhesive composition for exterior grade plywood comprising
(a) one part by weight of a water-soluble, thermosetting phenolic resin obtained by partially condensing from about 1.8 to about 3 moles of formaldehyde per mole of phenol,
(b) from about 0.4 part to about 1 part by weight of a water-swellable, causticized organic material,
(c) at least about 0.5 up to about 2 parts by weight of a finely divided calcium carbonate, the amount of causticized organic material and polyvalent metal carbonate added to the composition being sufficient to provide a total extension of the phenolic resin within the range of about 100% up to about 250%, and
(d) sufficient aqueous dispersing medium such that the total solids of the liquid adhesive composition is within the range from about 35 to about 60 percent by weight of the total composition.

24. A composition as in claim 23 wherein at least a major proportion of the causticized organic material is causticized organic residue from the acid hydrolysis of pentosan containing materials.

References Cited by the Examiner

UNITED STATES PATENTS

| | | | |
|---|---|---|---|
| 1,560,346 | 11/1925 | Fuller | 260—38 |
| 2,054,053 | 9/1936 | Hoffman | 260—38 |
| 2,190,605 | 2/1940 | Moore | 260—38 |
| 2,323,550 | 7/1943 | Lukens | 260—38 |
| 2,629,698 | 2/1953 | Sterling | 260—2.5 |
| 2,629,703 | 2/1953 | Vogelsang | 260—64 |

(Other references on following page)

UNITED STATES PATENTS

| | | | |
|---|---|---|---|
| 2,727,869 | 12/1955 | Ash et al. | 260—17.2 |
| 2,878,197 | 3/1959 | Baxter et al. | 260—17.2 |
| 2,967,836 | 1/1961 | Moffitt et al. | 260—17.2 |
| 3,046,240 | 7/1962 | Winter et al. | 260—28.5 |
| 3,074,897 | 1/1963 | Baker | 260—38 XR |

FOREIGN PATENTS

| | | |
|---|---|---|
| 607,773 | 9/1948 | Great Britain. |
| 781,731 | 8/1957 | Great Britain. |

WILLIAM H. SHORT, *Primary Examiner.*

E. M. WOODBERRY, *Assistant Examiner.*